United States Patent [19]
Faulhaber

[11] 3,887,814
[45] June 3, 1975

[54] YARN SLUB ANALYZER

[75] Inventor: Mark Edwin Faulhaber, Wilmington, Del.

[73] Assignee: E. I. du Pont de Nemours & Company, Wilmington, Del.

[22] Filed: Nov. 1, 1973

[21] Appl. No.: 412,040

[52] U.S. Cl............. 250/562; 250/214 R; 356/238; 330/75
[51] Int. Cl.[2]............................... G01N 21/32
[58] Field of Search .......... 250/562, 563, 572, 206, 250/214 R, 559; 356/237–239; 28/64; 330/75, 86; 328/128

[56] References Cited
UNITED STATES PATENTS

| | | | |
|---|---|---|---|
| 3,030,853 | 4/1962 | Strother | 356/237 X |
| 3,258,824 | 7/1966 | Gith | 28/64 |
| 3,451,756 | 6/1969 | Young | 356/237 |
| 3,494,236 | 2/1970 | Kono et al. | 250/559 X |
| 3,594,558 | 7/1971 | Loepfe | 235/151.3 |
| 3,746,865 | 7/1973 | Burch | 250/206 X |
| 3,752,980 | 8/1973 | Dixon et al. | 250/206 X |

*Primary Examiner*—Walter Stolwein

[57] ABSTRACT

A system for determining and characterizing slub content of yarns according to their diameter and length is disclosed. Yarn passing at a uniform rate through a photoelectric transducer furnishes an electrical signal output according to the yarn profile. The signal output is processed through various circuit combinations so that slubs are characterized from signal differences about a base yarn diameter and slubs which are in preselected diameter and length categories are counted for a predetermined length of yarn.

7 Claims, 12 Drawing Figures

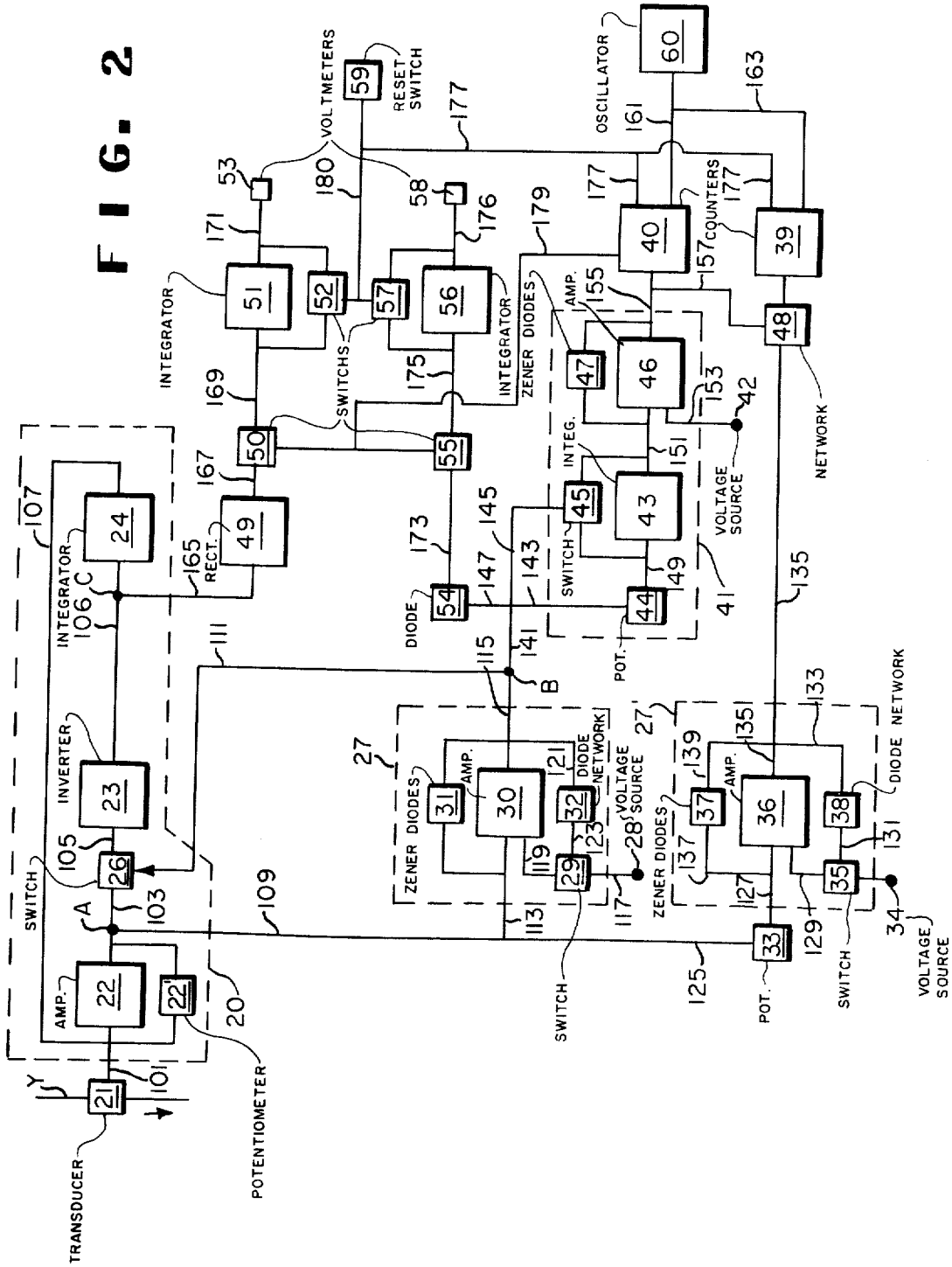

YARN SLUB ANALYZER

BACKGROUND OF THE INVENTION

This invention relates to apparatus for measuring variations in the diameter of textile yarns. More specifically it concerns electronic signal processing circuitry arranged to analyze signals which are proportional to instantaneous yarn diameter and provide output indicators of the number, sizes, and lengths of slubs, number of "slugs" and, optionally, yarn variability exclusive of slubs and total accumulated lengths of slubs.

Slubs are defined as short abnormally thick places in a yarn and slub yarn is defined as a fancy yarn in which slubs may be deliberately created to produce a desired effect. (See "Textile Terms and Definitions" — The Textile Institute, 5th Edition, August 1963). The effects that can be obtained from slub yarns obviously depends on the number, length and size of the slubs as well as their pattern of distribution along the yarn. Thus it is necessary for successful fabric appearance prediction to be able to characterize fully the yarn diameter variations not only with respect to the characteristics of the desirable slubs but also with respect to average yarn diameter variations in between slubs and to detect and eliminate undesirable large diameter deviations (slugs).

Numerous instruments are described in the prior art which are concerned primarily with the detection of knots, trash, slubs, double yarn and so forth. These teachings are generally concerned with the detection of undesirable yarn features rather than with the analysis or characterization of desirable yarn diameter modulations and, therefore, do not suggest any means to characterize slub yarn to satisfy proper characterization requirements.

SUMMARY OF THE INVENTION

A yarn inspection system wherein yarn moves at a uniform rate past a photoelectric means for generating an electric signal output corresponding to instantaneous variations in yarn diameter includes electronic means responsive to said photoelectric means for processing said electric signal output. The electronic means comprises an amplifier having input and output terminals with its input terminal connected to the photoelectric means. The amplifier produces a voltage output signal from the electric signal output of the photoelectric means. An electrical circuit is coupled to the amplifier input and output terminals for producing a time-averaged signal from said voltage output signal and for feeding said time-averaged signal back to the input terminal.

The system includes circuit means for maintaining the time-averaged signal constant and for providing an indication signal when said voltage output signal exceeds a predetermined minimum threshold value and means for establishing said minimum threshold value. There is also provided circuit means for measuring the duration of said indication signal and signaling each instance said duration exceeds a predetermined minimum time during a preselected time period. Included in the system also is circuit means for establishing a maximum threshold value and for signaling when said voltage output signal exceeds the maximum threshold value.

BRIEF DESCRIPTION OF DRAWINGS

FIG. 2 is a schematic block diagram with elements grouped according to their special functions;

DESCRIPTION OF THE PREFERRED EMBODIMENT

Figure 1A:
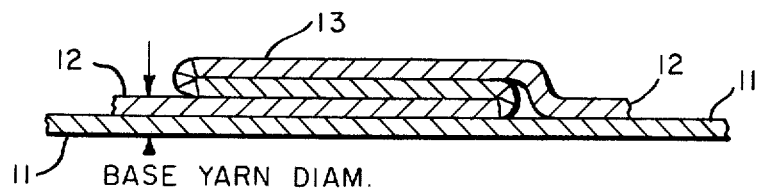
FIGS. 1A-1C show simplified representations of typical yarn foldbacks which go into the formation of slubs and FIGS. 1D-1F give idealized yarn cross-section shapes in the region of yarn slubs of different types.
Figure 1B:
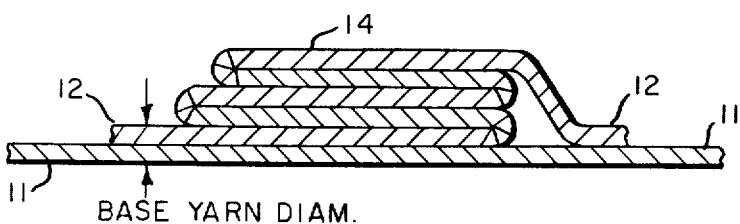
Figure 1C:
Figure 1D:
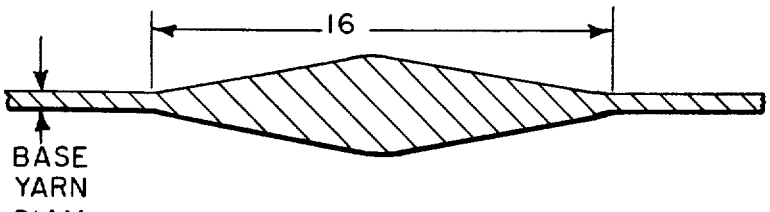
Figure 1E:
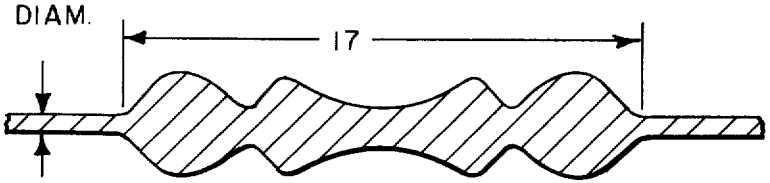
Figure 1F:
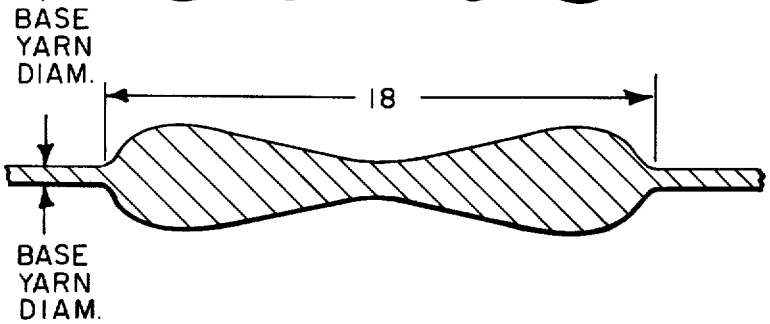

This invention provides apparatus for not only determining occurrences of purposely enlarged diameter sections (slubs) of a running yarn but also for characterizing the slub content of the yarn according to predetermined acceptable standards of not only yarn diameter but also length of the slubs. Means are also provided to detect and count the number of unacceptably large diameter deviations (slugs), and further, means are provided to measure the average yarn diameter deviation from a base yarn diameter over those lengths of yarns that have no countable slub. The apparatus comprises a conventional photoelectric yarn diameter transducer coupled with several special purpose electronic circuits. A novel drift compensation and zero reference circuit is provided and is coupled to a first yarn diameter discriminator arranged to actuate a slub length discriminator circuit and a counter circuit attached thereto. A special switch and integrator are arranged to integrate yarn diameter variations during those periods when the first discriminator is not actuated. A second diameter discriminator circuit is provided with a considerably larger set point so that it is arranged to be activated for undesirably large yarn diameter variations (slugs) and actuate a counter upon such occurrences. The slub length discriminator is provided with a second output which goes to an integrator in order to provide a readout of total slub length. A controlled oscillator is connected to the counter circuits to provide time signals in order to enable characterizing the slub numbers, slug numbers and total slub length determinations according to a preselected time interval and, therefore, in the case of uniformly moving yarn, chacterizations according to a predetermined yarn length. A reset switch is provided in order to return the apparatus to a ready condition after the preselected time interval for measurement has passed.

In order to understand the practical significance of the present invention, reference is made first to FIG. 1. FIGS. 1A, 1B, and 1C show slubs 13, 14, 15 of interest which are formed, for example, by purposely folding over one 12 of two yarns and combining it with the second yarn 11 which is held straight. Thus, in FIG. 1A, a slub 13 is shown to comprise a single foldback of yarn 12. In such a case if the base yarn and the folded yarn each have a denier of 60, the unslubbed region would have a combined denier of 120. The slub 13, however, would have a denier of 240. A double foldback 14 as shown in FIG. 1B might have a maximum denier of 360. A long slender slub or a slub of varying cross section 15 may be formed from many closely grouped single or double foldbacks as shown in FIG. 1C. FIGS. 1D, 1E, and 1F show idealized yarn cross sections 16, 17 and 18 respectively made from combinations of foldbacks produced in the manufacture of slub yarns. These contours have been found to represent slubs which appear in fabrics as single slubs. However, ability to provide a single slub count for yarns having slub contours such as, particularly, FIGS. 1E and 1F, is an important attribute of the present invention.

Turning now to FIG. 2 a yarn y is seen to pass through a typical photoelectric yarn diameter transducer 21 such as a Loepfe Model FR-30 transducer. The output of transducer 21 is connected over line 101 to the input terminal of component 22 of drift compensation and zero reference circuit 20. Component 22 comprises an amplifier which has its output terminal connected over line 103 through switch 26 and then over line 105 to inverter circuit 23 and then on over line 106 to integrator circuit 24. The output of circuit 24 is connected over line 107 back to the input terminal of amplifier 22. A gain adjusting feedback circuit 22' is connected across the input and output terminals of amplifier 22. One output line, 109, from circuit 20 is internally connected to line 103 at point A. An input line 111 connects to the operating terminal of switch 26 and extends from a point B in the subsequent circuitry as described below.

The output signal in line 109 is first connected over line 113 to one input terminal of a first yarn diameter discriminator circuit 27. Discriminator 27 comprises an amplifier 30 connected between input line 113 and output line 115. A back-to-back Zener diode feedback circuit 31 is connected across the input and output terminals of amplifier 30. A source 28 of reference voltage is connected through an electronic switch 29 via line 117 and then over line 119 to a second input terminal of amplifier 30. The gate terminal of switch 29 receives signals over line 123 from diode 32 which in turn is connected over line 121 to the output line 115 of amplifier 30. This completes the structure of first discriminator 27.

The output signal in line 109 is also connected over line 125 through a variable control element 33 and thence over line 127 to a first input terminal of a second discriminator circuit 27'. Discriminator 27' is very similar in the basic structure to discriminator 27 except for some of the circuit constants. Thus, a reference voltage source 34 connects through switch 35 to an input terminal of amplifier 36 over line 129. Switch 35, which in the preferred embodiment is a field effect transistor (FET) switching gate, is gated by a signal received over line 131 through diode 38 by a connecting line 133 to the output line 135 of amplifier 36. A back-to-back Zener diode assembly 37 is connected across the input and output terminals of amplifier 36 by way of lines 137 and 139, respectively. Output line 135 from circuit 27' extends through network 48 to the input terminal of electronic counter 39.

Figure 2A:
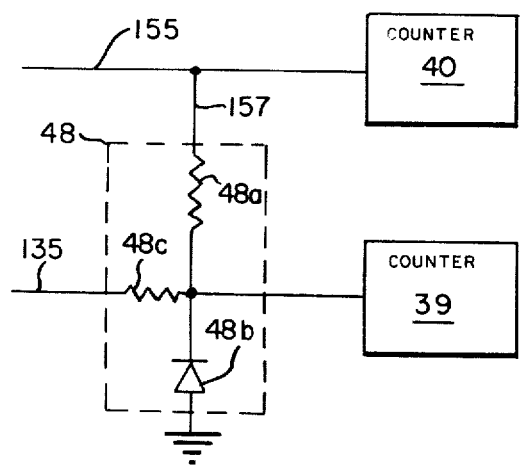
FIG. 2A is a circuit diagram for a network connecting two counters.

Returning now to the center of FIG. 2, specifically to point B on the output line 115 from discriminator 27, a line 111, as noted above, extends to the control terminal of switch 26. In addition, a line 141 extends from point B and branches to three lines 143, 145, and 147. Line 143 carries a first input signal to slub length discriminator circuit 41 by connection to the input terminal of settable control element 44 (e.g., a potentiometer) from which it passes over line 149 to the input terminal of integrator 43. A switch 45 is connected around integrator 43 between its input line 149 and output line 151. The control terminal of switch 45 is connected over line 145 back to point B and, therefore, the voltage at B is employed to control the condition of switch 45. The output of integrator 43 is connected over line 151 to the input terminal of amplifier 46. A reference voltage source 42 is also connected to the input of amplifier 46, over line 153. Amplifier 46 also has back-to-back Zener diode circuit 47 connected across its input and output terminals. The output of amplifier 46 is then connected over line 155 to slub counter 40. The output of amplifier 46 is also connected over line 157 through network 48 to the input of counter 39. The preferred circuit for network 48 will be discussed by reference to FIG. 2A below.

A special internal clock oscillator circuit 60 is connected via lines 161 and 163 to counting interval control contacts of counter 40 and counter 39, respectively.

In this preferred embodiment additional circuitry is provided in order to obtain base yarn variability and in addition the total length of slubs in a preselected yarn sample length. Thus a line 165 is connected to line 106 at point C between inverter 23 and integrator 24 in circuit 20. Line 165 leads to half-wave rectifier circuit 49, the output of which is led over line 167 through switch 50 and thence over line 169 to integrator circuit 51. A voltmeter 53 is connected to the output line 171 of integrator 51. An electronic switch 52 is connected across the input and output terminals of integrator 51. The output of voltmeter 53 at the end of the sampling period will be indicative of the total yarn diameter deviation in the yarn exclusive of slubs.

For determining the total length of slubs a line 147 is connected from point B via line 141 through diode 54, over line 173 through switch 55 and over line 175 to the input terminal of integrator circuit 56. A second voltmeter 58 is connected to the output line 176 of integrator 56. An electronic switch 57 is connected across the input and output terminals of integrator 56. An output signal from slub counter 40 is carried over line 179 to the control terminals of both switches 50 and 55. Finally, a reset switch 59 is connected over line 177 to the reset terminals of both counters 40 and 39. Switch 59 is also connected over line 180 to the control terminals of switches 52 and 57.

Turning now to FIG. 2A, network 48 is seen to comprise a resistor 48a inserted in line 157 between lines 155 and 135 and a diode 48b connected between line 135 and ground. Diode 48b is connected as shown to shunt any negative voltage at the input of counter 39 to ground.

Figure 3A:
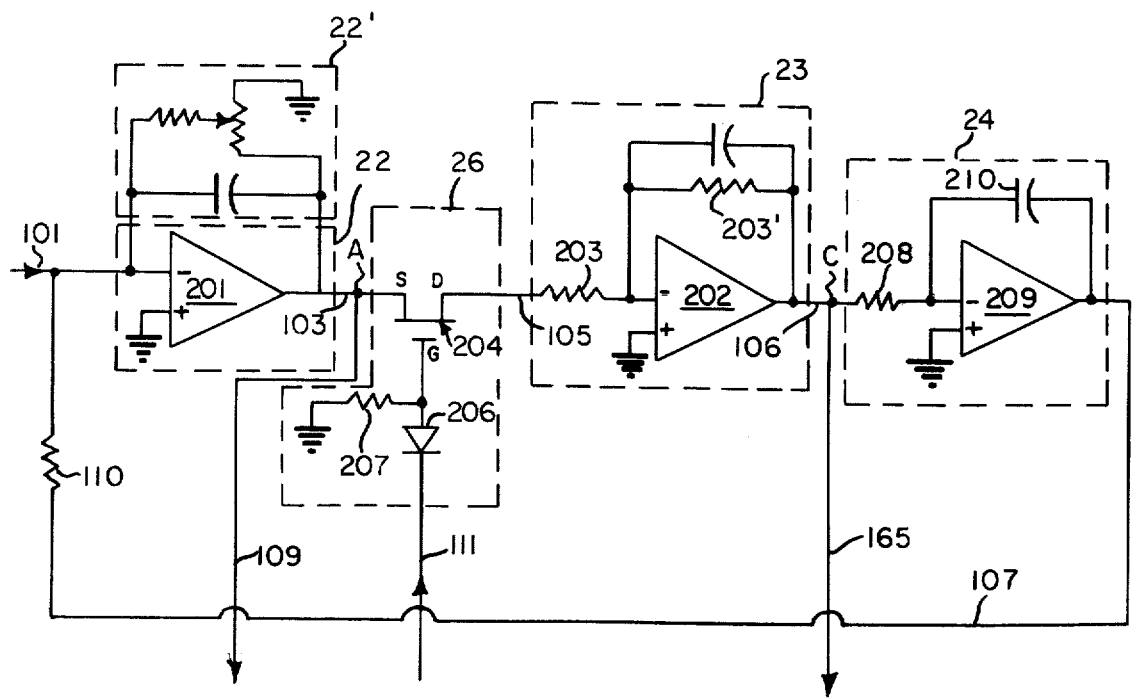
FIGS. 3A through 3D are schematic circuit diagrams for some of the elements of FIG. 2.

Circuit details of the drift compensation and zero reference circuit (element 20 of FIG. 2) are shown in FIG. 3A. The output of transducer 21 is received over line 101 and fed into the negative terminal of amplifier 201. In the preferred embodiment, this and all other amplifiers in this and other circuits shown are operational amplifiers, e.g., Philbrick-Nexus Type No. 101101 amplifiers. The gain adjusting feedback circuit 22' is seen to comprise a noise filter capacitor in parallel with a branch containing a resistor and potentiometer all connected around the amplifier 201. The output of amplifier 201 is connected as noted before to a switch 26 which comprises FET 204 (e.g., P-type FET, type MEM511A) with its source connected to line 103 and its drain connected to the output line 105. Input line 111 to switch 26 is connected through diode 206 to the gate terminal of the FET 204 with a resistor 207 connected to ground between this diode and the gate. Output of this switch 26 is connected over line 105 to circuit 23 arranged as an inverter. It comprises an input resistor 203 and a second amplifier 202 which has connected around it a gain setting feedback circuit comprising a resistor 203' and noise filter capacitor in parallel. The gain of amplifier 202 (normally unity) is set by the ratio of the resistance values of resistors 203' and 203. it should be noted that line 109 is shown connected to line 103 at point A as previously described by reference to FIG. 2. Line 106 then extends to integrator circuit 24 which comprises an input resistor 208 and amplifier 209 with suitable integrating capacitor 210 in feedback around this amplifier. This capacitor is chosen to provide a suitable time constant as described under the operation description to follow. The output of amplifier 209 connects to line 107 back to input line 101 of ths subcircuit through summing resistor 110. Line 165 connects to point C on line 106 between inverter 23 and integrator 24 as previously noted for FIG. 2.

Figure 3B:
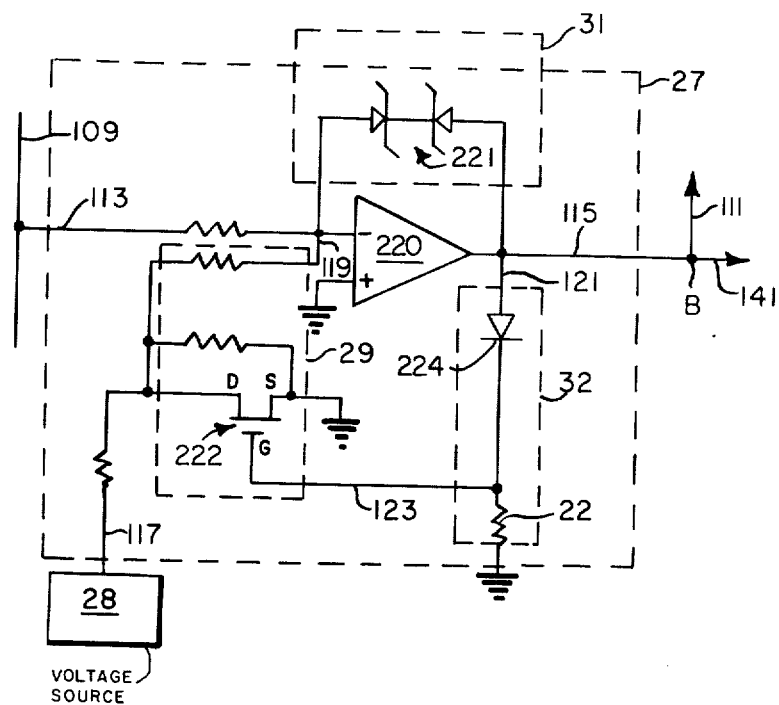

Details of slub diameter discriminator circuit 27 are given in FIG. 3B. Thus, input signals from point A in circuit 20 are fed off line 109 into circuit 27 of FIG. 3B over line 113. This line is connected through a resistor to the negative input terminal of amplifier 220. A back-to-back Zener diode array 221 is connected across the negative input terminal and the output terminal of amplifier 220. The positive input terminal of amplifier 220 is grounded. Another line 119 extends from the negative input terminal of amplifier 220 to subcircuit 29. Thus, line 119 connects through a first resistor to the drain terminal D of FET 222 (e.g., N-type FET, type 2N4351). The source terminal S of this transistor is connected to ground and through another resistor to the drain terminal. The drain terminal is connected through a third resistor to line 117 which extends from reference voltage source 28. The gate terminal G of transistor 222 extends over line 123 to diode circuit 32. This latter circuit comprises a line 121 extending from the output of amplifier 220 to diode 224 and thence to line 123. This latter line is connected through resistor 225 to ground. The output of amplifier 220 extends over line 115 to point B from which lines 111 and 141 extend as shown also in FIG. 2.

Slug discriminator circuit 27' of FIG. 2 has the same basic internal structure but with different circuit constants as circuit 27 described just above by reference to FIG. 3B.

Figure 3C:
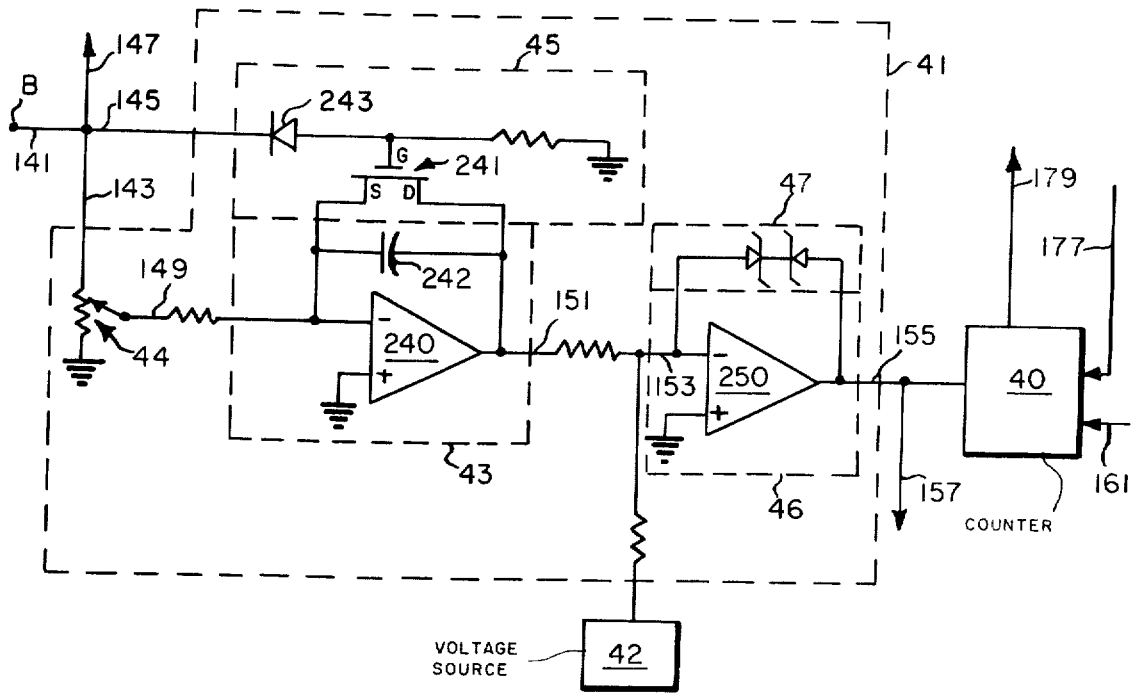

The slub length discriminator circuit 41 of FIG. 2 is shown in detail in FIG. 3C. Thus line 141, proceeding from point B of FIG. 2, divides into lines 143, 145, and 147. Line 143 is connected to potentiometer 44 and thence over line 149 and through a resistor to the negative input terminal of amplifier 240. The positive input terminal of this amplifier as well as the lower end of potentiometer 44 is connected to ground. Integrating capacitor 242 is connected in feedback across the input and output terminals of amplifier 240. Connected also to the negative input terminal of amplifier 240 is the source terminal of FET 241. The drain terminal of this transistor is connected to the output terminal of amplifier 240. Line 145 connects through diode 243 to the gate terminal of FET 241 (e.g., P-type FET, Type MEM511A). This gate terminal is also connected through a resistor to ground as shown. FET 241 along with diode 243 and its resistor to ground comprise the switch circuit 45 of FIG. 2. Line 151 extends from the output terminal of amplifier 240 through a resistor to the negative input terminal of amplifier 250. The positive input terminal of this amplifier is also grounded. A back-to-back Zener diode assembly 47 is connected across the input and output terminals of amplifier 250. Reference voltage source 42 is connected through a resistor to line 153 which is attached to the negative input terminal of amplifier 250. The output terminal of amplifier 250 connects over line 155 to the input terminal of counter 40 which in this preferred embodiment is a commercial electronic counter. A line 157 extends from line 155 to the network circuitry shown in FIG. 2A. Input lines 177 and 161 to the counter 40 extend from the reset and clock circuits respectively as previously noted and an output signal goes from counter 40 over line 179 to a point in the circuitry to be described below.

Figure 3D:
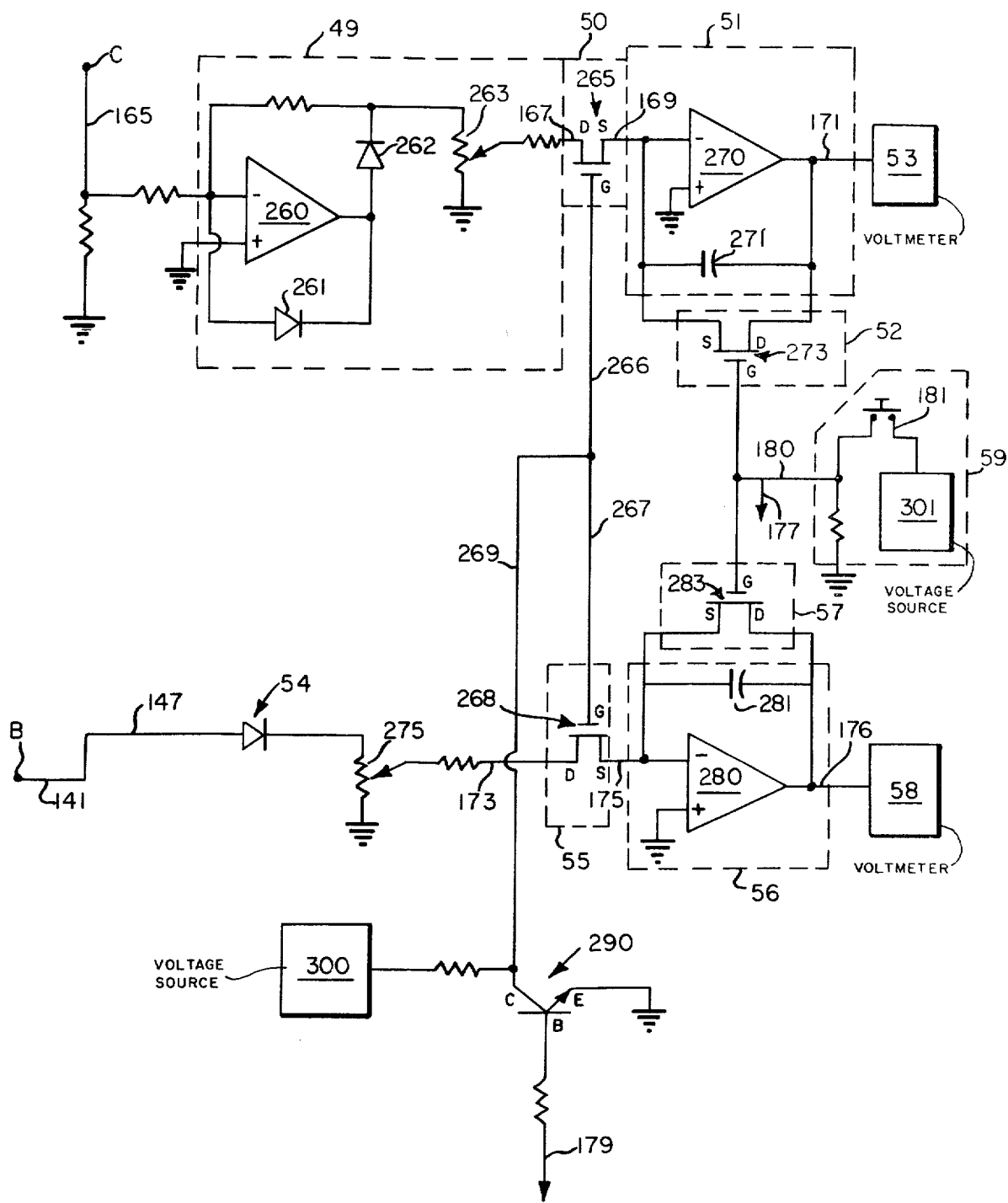

Auxiliary circuitry is provided to measure the average yarn diameter variations exclusive of slubs or slugs and further to measure the total aggregate slub length in a given length yarn sample. This circuitry is shown in FIG. 3D. Thus, the line 165 extending from point C of FIG. 2 is connected by a branch circuit through a resistor to the negative input terminal of amplifier 260. The positive input terminal of this amplifier is grounded. A first diode 261 is connected from the negative input terminal to the output terminal of amplifier 260. A second diode 262 is connected from the output terminal of amplifier 260 through a resistor to the negative input terminal of this amplifier. The point between diode 262 and its associated resistor is connected to a potentiometer 263, the adjustable output of which extends through a resistor and over line 167 to the drain terminal of FET 265 (type 2N4351). The source terminal of this FET is connected to line 169 and the gate terminal to line 266 which joins a line 267 extending from the gate terminal of a similar FET 268 (type 2N4351). Line 169 from FET 265 extends to the negative input terminal of amplifier 270, the positive input terminal of which is connected to ground. Integrator capacitor 271 connects in feedback across the negative input terminal and the output terminal of amplifier 270. This combination comprises integrator 51 of FIG. 2. Output line 171 from this integrator extends to voltmeter 53 as previously described. The source S and drain D of FET 273 (type MEM511A) are connected also across the negative input and the output terminals respectively of amplifier 270. The gate terminal of this FET is connected over line 180 through a pushbutton switch 181 to a voltage source 301. Line 180 is also connected through a resistor to ground. (This resistor, switch 181 and voltage source 301 comprise reset switch 59 of FIG. 2 which, by connection through line 177 resets counters 40 and 39 as well as switches 52 and 57). The arrangement of FET 273 makes up the switch 52 of FIG. 2. Another FET 268 (type 2N4351) is shown with its gate terminal connected to line 267 which along with line 266 connects to line 269. Line 269 connects to the collector terminal C of transistor 290. In this particular embodiment, transistor 290 is a GE 2N2926 NPN transistor. The emitter terminal E of this transistor is grounded. The collector terminal is also connected through a resistor to a positive voltage source 300 and the base terminal is connected through a resistor to line 179 extending as noted before from counter circuit 40. This completes the average yarn diameter variability circuit of FIG. 2.

Continuing with FIG. 3D to describe the total slub length monitor, line 141 extending from point B as previously described splits and line 147 extends therefrom through diode 54 and an associated potentiometer 275. The adjustable output of this potentiometer extends through a resistor over line 173 to the drain terminal D of FET 268. The source terminal of this transistor is connected over line 175 to the negative input terminal of an amplifier 280. The gate terminal of this FET 268 is connected as noted above to line 267 and thereby forms the switch 55 of FIG. 2. Amplifier 280 has an integrating capacitor 281 connected in feedback across its negative input terminal and its output terminal. The source and drain terminals of FET 283 (type 2N4351) are also connected across these input and output terminals respectively of this amplifier 280. FET 283 comprises the switch 57 of FIG. 2 and its gate terminal is connected to line 180. The output from amplifier 280 (integrator 56) is connected to voltmeter 58 for a readout of total slub length. The positive input terminal of amplifier 280 is connected to ground.

OPERATION AND FUNCTIONAL ADVANTAGES

The operation of this invention will be described first in terms of its simplest form comprising the transducer 21, drift compensation and zero reference subcircuit 20, slub diameter discriminator 27, slub length discriminator 41, and counter 40. Descriptions of the auxiliary features of this invention will follow. Thus, yarn profile for yarn passing at uniform rate through transducer 21 furnishes an electrical signal output which is processed first by the circuit shown within the dashed lines of FIG. 2 and designated circuit 20. The photocurrent from the detector is fed into operational amplifier 22 to produce a voltage output signal at its output terminal which represents the yarn diameter. The magnitude of this voltage is set to be within a practical range for other parts by the feedback and gain adjust circuit 22'. This is set by using a calibrating wire in transducer 21 with a diameter corresponding to the nominal denier of the yarn to be monitored. Thus, the instantaneous voltage at the output of amplifier 22 is representative of the diameter of the yarn. This voltage which appears at point A is needed and processed in the several circuits.

This voltage at A is fed first through switch 26 (to be discussed below) to inverter 23 which reverses the polarity of the voltage. The signal then passes into integrator 24, the output of which is fed back as shown to the input of amplifier 22. Circuits 22, 23 and 24 are connected in a closed loop with the result that when the voltage at A, the output of amplifier 22, departs from zero the output of integrator 24 changes at a rate proportional to the signal. Therefore, the output of integrator 24 (a time-averaged signal) when fed back to the input terminal of amplifier 22 balances or "bucks out" the signal from detector 21. When the signal from detector 21 is balanced by the feed back from integrator 24 the signal output of amplifier 22 is zero. This signal balancing performed by the circuit 20 produces a voltage at A which is a measure of the changes in yarn diameter which are significantly different from the average diameter of the yarn. The time constant of integrator 24 is selected to provide zero correction at a much slower rate than signal changes from detector 21 and thus, a relatively long term average value is produced. In this way, this circuit provides a stable reference level at zero for slub detection and additionally compensates for any long term offset, or "drifts" in the electronic circuitry.

Circuit 20 thus establishes the zero reference at A to represent the average feed yarn diameter. However, the signals produced by slubs are excluded from this average. This is accomplished by including switch 26 in the loop. When switch 26 is opened during a slub event, the output of integrator 24 is preserved at the value it had prior to the slub event and which is required to balance the detector input signal for the average feed yarn diameter exclusive of slubs. Therefore, during the time while switch 26 is open, the output at A is no longer zero but now its value is indicative of the features of the slub event. From a commercial standpoint the aesthetics of the slub yarns depend not only on slub diameter but also on the length of yarn having this enlarged yarn diameter. Thus, slubs are defined and must be measured in terms of a predetermined minimum diameter and minimum length. In the apparatus of this invention, the signal must pass both diameter and length tests to be counted as a slub. As an auxiliary feature, an additional and separate measure of diameter is included in order to detect slubs which are unacceptably thick and might cause a mill stop. These are called slugs and are counted separately as an indication of yarn quality by means of the auxiliary circuitry noted later.

The primary feature of a given slub which is detected first comprises the distinct and usually radical diameter change of the yarn passing through the detector 21. The signal produced will cause a non-zero voltage to appear at point A because the event occurs at a rate too rapid for the integrator 24 to balance instantaneously due to its selected slower time constant. This signal voltage at A is applied to one input of a slub diameter discriminator 27 as previously noted. In discriminator 27 the signal from point A is combined with a preset reference threshold voltage applied from source 28 to set the polarity of the voltage at point B. In the absence of a slub the reference voltage from source 28 keeps the polarity of the voltage at point B negative, for example. The advent of the slub with a diameter exceeding the predetermined minimum will produce a voltage at point A which will exceed the threshold value of the reference from 28 with the result that the voltage at point B will then become positive.

This polarity reversal is used to perform two primary switching functions. First, switch 26 within circuit 20 is opened to break the loop and, as mentioned above, this results in having the value of the signal from integrator 24 held at that value which is indicative of average yarn diameter exclusive of slubs. Thus, slub signal information is not included in the integration that would normally shift the feedback to bring the voltage at A to zero. Second, the polarity reversal at point B simultaneously operates a switch 29 within discriminator 27 to short the reference 28 to ground.

This second switching, (that of switch 29), provides for voltage at point B to remain at the polarity which provides an indication signal or indicates a slub event until the voltage at point A returns to zero. This is assured by removing the threshold reference voltage from the discriminator input. By this feature, single slubs such as 17 or 18 of FIGS. 1E and 1F, which have multiple levels and/or thin centers, will be counted only once, as desired. It has been determined that, in practical appearance, these serve as a single slub feature.

When the signal at A returns to zero (yarn diameter returns to normal) the voltage at point B reverses polarity which serves to close switch 26 and restore the feedback loop in circuit 20. This also opens switch 29 which restores the threshold reference voltage from supply 28 to the discriminator 27.

A specific preferred embodiment of the discriminator circuit 27 (FIG. 3B) functions as follows. A reference voltage of +1.4 volts from voltage source 28 is applied to one input of amplifier 30 through switch 29 and provides the threshold value which the signal from point A (FIGS. 2 and 3A), applied to the other input to amplifier 30, must exceed. In the absence of a slub, voltage at A is zero, and the positive 1.4 reference voltage produces an output at point B of −10V. This output results from the action of feedback circuit 31 which comprises two 10V Zener diodes back-to-back (array 221 of FIG. 3B). This feedback circuit produces a constant output voltage at B of 10V with a polarity opposite to the polarity of the net input voltage. Thus when the signal voltage from point A, due to the advent of a slub, is more negative than −1.4V, then net input to amplifier 30 is negative and the voltage at point B switches to +10V. This positive voltage at point B opens switch 26 which is an FET switching gate 204 as shown in FIG. 3A. This switch is in the loop of circuit 20 (FIG. 2) or FIG. 3A as described above. The positive voltage at B causes a similar action to be taken through diode 32 and closes switch 29, the switching here effectively shorts out the +1.4V reference voltage so that the reference input to amplifier 30 is now nearly zero volts (slightly positive). Thus, discriminator circuit 27 holds its output at point B at a value of +10V until the signal at A drops to zero volts (average yarn diameter, since integrator 24 is holding feedback to amplifier 201 of FIG. 3A at the level required for average diameter). This occurs at the end of a slub event. This slightly positive voltage at the reference input causes the output of the discriminator 27 to switch back to −10V at point B which resets the +1.4 volt reference threshold to discriminator 27 by opening switch 29 and at the same time closes switch 26 in the loop in circuit 20.

Slug discriminator 27' is very similar as noted above to slub discriminator 27. In circuit 27' a reference threshold of +1.4V is applied from source 34 through switch 35 to the input of amplifier 36. The slub signal from point A is passed through a variable input control element 33 prior to its application to the input of amplifier 36. Since a slug is by designation an excessively large diameter slub, for example, having a diameter 4X that of the minimum diameter of a slub, then control 33 would be set so that the input to amplifier 36 would be 25 percent of the signal at point A. Thus, a signal level or maximum threshold value 4X that required to "switch" discriminator circuit 27 would be required to switch circuit 27', since the circuit constants of 27' are the same as those of 27. Such a high signal at point A would be indicative of a slug as defined in this example. As in circuit 27, 10V Zener diodes back-to-back make up circuit 37 which insures a −10V output from circuit 27' until the input through control 33 is more negative than −1.4V. Now the net input to amplifier 36 is negative and circuit 27' switches its output to +10V. This positive voltage through diode 38 activates FET switch 35 to reduce the reference input to nearly zero volts (as with circuit 27). The +10V output is available to operate counter 39 to register a slug count.

A further novel feature of this invention is the slub length discriminator circuit 41 (FIGS. 2 and 3C) which provides that slubs must exceed both a minimum length as well as a minimum diameter to be counted. Thus, discriminator circuit 27 first determines that a yarn diameter change is large enough to indicate passage of a slub as described above. However, before a slub event count is recorded, length discriminator 41 must determine that this diameter change occurs over a sufficient length to indicate a countable slub. Thus, as described above, the occurrence of a diameter change which is sufficient enough to indicate a slub causes a switching action to change the output voltage at point B to +10V. This voltage polarity change at point B is now additionally used to activate the slub length discriminator circuit 41. Thus, when the voltage at point B indicates the presence of a slub and this voltage persists for a sufficient length of yarn a signal is generated in circuit 41 which is compared to the reference voltage applied from source 42 and provides a signal to counter 40. This length discriminating function is accomplished as follows. Since the length of a slub on a yarn line moving at essentially constant speed is a function of the time duration of the event, the output of integrator 43 will be indicative of slub length. This is true because the input signal to integrator 43 is constant during the extent of the slub event. Thus, the voltage at point B is passed through settable control 44 (e.g., a potentiometer) to the input of integrator 43. However, operation of integrator 43 is dependent on the condition of an FET switching gate 45. Switch 45 is controlled by the polarity of the voltage at point B. Negative voltage at point B (absence of a slub) maintains switch 45 in a closed condition and keeps integrator 43 inoperative by effectively shorting the output of the integrator to the input.

When a slub event changes the voltage at point B to +10V, switch 45 is opened and a predetermined fraction of the 10V is supplied to the input of integrator 43. The output of this integrator will rise linearly with time at a rate dependent on the setting of control 44. The output will continue to rise until the voltage at point B switches back to −10V which occurs at the end of the slub event. This polarity change at point B closes switch 45 which again shorts out the integrator 43. However, if the output of integrator 43 during its activation period rises to a value greater than the reference level from source 42, the output of amplifier 46 will switch from −10V to +10V on line 155 in a similar way as described above for discriminator 27. This switch in output causes counter 40 to register a count of a slub which not only exceeds a preselected diameter increase but also exceeds a preselected length.

Should the slub length be shorter than the preselected minimum, the output of integrator 43 will not have sufficient time to rise to a level greater than the reference level from 42 during the activation period. The output of amplifier 46 then will not be switched and no slub count will be added to the stored count on counter 40 even though the yarn diameter exceeded that preselected as defining a slub.

The minimum length of slub which will be counted is pre-adjusted by not only the selection of voltage of reference source 42 but also by the setting of control 44.

Control 44 provides a very convenient means for selecting and setting slub length to be monitored.

Counters 40 and 39 are arranged as noted to register the total number of slubs and slugs, respectively, occurring during a preset time interval. This interval is selected to correspond to a particular (significant sample) length of yarn traveling at constant linear speed. In this preferred embodiment, as shown, network 48 (FIG. 2A) is included so that counters 39 and 40 will register a slug only when the length requirement of a slub is met. Thus, a count will be added to both counters for this condition. Both counters are selected to count only positive pulses. Thus, for the embodiment of network 48 as shown in FIG. 2A the following "Truth Table" shows counter inputs and indications for various output values appearing at amplifiers 36 and 46.

signal at point C will provide information about base yarn changes exclusive of slub event changes since slub events have been eliminated by action of switch 26.

It has been found reasonable to expect that the diameter variations (exclusive of slug and slub events) will consist of equivalent positive and negative deviations about the base yarn diameter. Thus the signal at point C is fed to circuit means 49 in which the signal is half-wave rectified and amplified. The resulting unipolar signal output from circuit 49 has an average value proportional to the mean variability of the base yarn diameter. This amplitude varying signal is fed through switch 50 to integrator 51 and the output at voltmeter 53 is read at the end of the sampling period. This output value will then be indicative of the total yarn diameter deviation in the yarn exclusive of slubs.

A voltage which is representative of the total length

| Detected Diameter | Output Amp 36 | Slub Length Indication | Output Amp 46 | Counter Input | | Counter Indication | |
|---|---|---|---|---|---|---|---|
| | | | | 40-Slub | 39-"Slug" | 40-Slub | 39-"Slug" |
| "Slug" | +10V | <Minimum | −10V | −10V | 0V | No | No |
| "Slug" | +10V | ≥ Minimum | +10V | +10V | +10V | Yes | Yes |
| No "Slug" | −10V | <Minimum | −10V | −10V | 0V | No | No |
| No "Slug" | −10V | ≥ Minimum | +10V | +10V | 0V | Yes | No |

In this embodiment as described above, counts are made of slugs only when they exceed the predetermined or preselected length required for counting of slubs also. Removal of resistor 48a (FIG. 2A) would permit one of several options to be exercised in counting slub and slug events. In this case, all slugs would be counted without regard to length. A further option is attained by removing resistor 48a and setting variable control 33 so that diameter discriminators 27 and 27' have the same input signal value. If also the circuit constants of both discriminators are the same, then counter 40 will register slub events meeting the preset diameter and length criteria whereas counter 39 will register all slub events independent of length restraints.

A still further option would be apparent to one skilled in the art wherein additional channels are incorporated in parallel with discriminator 27 and arranged to provide counts of slubs in several diameter and/or length categories. In this case, the slub diameter discriminator which detects the smallest diameter slub would provide the polarity changing voltage at point B used to change the condition of switch 26 in the loop of yarn base diameter circuit 20. Diameter and length discrimination levels could be set in each channel as desired by applying different reference voltages corresponding to voltage sources 28 and 42 for each parallel circuit or by adjustment of a control such as 33 ahead of each diameter discriminator and through adjustment of and use of controls such as control 44 in each length discriminator.

Operation of the additional auxiliary circuitry for measurements of base yarn variability and in addition the total length of slubs in a given yarn sample length is best understood by reference again to FIG. 2. Thus, except during a slub event, switch 26 is closed and the voltage at point C like that at point A has an average value of zero. Yarn "loopiness" and minor yarn diameter variations and nonuniformities will cause instantaneous signal values at points A and C which are indicative of the small deviations in yarn base diameter. The of slubs in a given sample length is available on voltmeter 58. This voltage is generated by passing the voltage at point B, when it is positive (which it is during a slub event), into a special integrator circuit (circuit elements 54–57 of FIG. 2). Thus the voltage at point B when it is positive will pass through diode 54 and switch 55 when it is closed as discussed later and be fed to integrator 56. The signal fed to integrator 56 will be a constant value and the ontime of the integration performed by this integrator will determine the magnitude of the output read at voltmeter 58. Since this "on-time" is directly related to each slub length the voltage at 58 at the end of the sampling period will be indicative of the aggregate slub lengths during that period which, again, will characterize a predetermined sample length if the yarn is moving at essentially constant speed through the instrument.

In some applications, it is desirable to arrange the instrument to be operable on "in-process", continuously running, yarn. A simple expedient is to relate all measurements to a predetermined significant yarn sample length by employing a time period measurement related to yarn processing speed. Thus, a special internal clock oscillator 60 is used as an external standard to set the counting intervals of counters 39 and 40.

To start a measurement cycle, reset switch 59 (FIG. 2) is momentarily closed which, through connectors 177 to each counter, clears the counts from each and starts a new count cycle. At the same time, this closing of reset switch 59 closes FET switches 52 and 57 for a period long enough to clear integrators 51 and 56 by momentarily shorting the output to the input so that a zero reading will appear on voltmeters 53 and 58. Slub counter 40 provides a gating signal over line 179 at the beginning of the count cycle which closes switches 50 and 55 in the auxiliary circuit of FIG. 3D described above. This gating signal keeps these switches closed for the counting cycle after which they are opened preventing any further base diameter variation signals or slub length signals to be applied to the respective integrators 51 and 56. At the same time counters 39 and 4o will be adjusted to hold the count of slubs and slugs, respectively, while the diameter length values are held in meters 53 and 58. This action is controlled by clock circuit 60. Reset switch 59 must be closed to clear and recycle the analyzer circuits.

A novel yarn diameter monitoring system has been described in its simplest form and with auxiliary circuitry for various types of yarn diameter or slub yarn characterization. As noted, these auxiliary systems are added to the basic apparatus to provide multiple levels of yarn diameter characterization including such things as loopiness and bundle separation. Other modifications or variations may be apparent to one skilled in the art and, therefore, this invention should be considered restricted only by this scope of the appended claims.

What is claimed is:

1. In a yarn inspection system wherein yarn moves at a uniform rate past a photoelectric means for generating an electric signal output corresponding to instantaneous variations in yarn diameter and including electronic means responsive to said photoelectric means for processing said electric signal output, said electronic means comprising: an amplifier having input and output terminals, said input terminal being connected to said photoelectric means, said amplifier producing a voltage output signal from said electric output signal, an electrical circuit coupled to the amplifier input and output terminals for producing a time-averaged signal from said voltage output signal and for feeding said time-averaged signal back to the input terminal; means for maintaining said time-averaged signal constant and for providing an indication signal when said voltage output signal exceeds a predetermined minimum threshold value; and means for establishing said minimum threshold value.

2. The system as defined in claim 1, including means for measuring the duration of said indication signal and signaling each instance said duration exceeds a predetermined minimum time during a preselected period of time.

3. The system as defined in claim 2, further including means for integrating the durations signaled.

4. The system as defined in claim 1, including means for establishing a maximum threshold value and for signaling when said voltage output signal exceeds said maximum threshold signal.

5. In a yarn inspection system wherein yarn moves at a uniform rate past a photoelectric means for generating an electric signal output corresponding to instantaneous variations in yarn diameter and including electronic means responsive to said photoelectric means for processing said electric signal output, said electronic means comprising: an amplifier having input and output terminals, said input terminal being connected to said photoelectric means, said amplifier producing a voltage output signal from said electric output signal; an electrical circuit coupled to the amplifier input and output terminals for producing a time-averaged signal from said voltage output signal and for feeding said time-averaged signal back to the input terminal; means for maintaining said time-averaged signal constant and for providing an indication signal when said voltage output signal exceeds a predetermined minimum threshold value; means for establishing said minimum threshold value; and means for measuring the duration of said indication signal and signaling each instance said duration exceeds a predetermined minimum time during a preselected period of time.

6. The system as defined in claim 5, further including means for integrating the durations signaled.

7. The system as defined in claim 5, including means for establishing a maximum threshold value and for signaling when said voltage output signal exceeds said maximum threshold signal.

* * * * *